Jan. 9, 1940.   H. O. FUCHS   2,186,287

STEERING LINKAGE

Filed April 11, 1938

Inventor
Henry O. Fuchs
By Blackmor, Spencer & Hirt
Attorneys

Patented Jan. 9, 1940

2,186,287

UNITED STATES PATENT OFFICE 2,186,287

STEERING LINKAGE

Henry O. Fuchs, Detroit, Mich., assignor to General Motors Corporation, Detroit, Mich., a corporation of Delaware Application April 11, 1938, Serial No. 201,218

4 Claims. (Cl. 280—95)

This invention relates to the steering linkage between the steering gear and the dirigible wheels of a vehicle.

It relates especially to a steering linkage for a pair of wheels independently suspended on opposite sides of a motor vehicle frame, and capable of dirigible movement in relation to the suspension means.

The steering linkage for wheels thus suspended commonly includes a pair of equal length tie rods connecting steering arms associated with the wheel spindles to a lever arm centrally situated on the vehicle frame, with a reach-rod connecting the lever arm to a steering gear towards one side of the vehicle frame.

The object of the invention is to effect economy and simplification of the parts of a steering linkage between independently suspended dirigible wheels and a steering gear, with a construction such that the steering will be substantially unaffected by upward and downward deflections of the wheels relatively to the vehicle frame.

A further object of the invention is a construction in which the pivotal connections between the tie rods and the steering gear are towards one side of the vehicle frame, to avoid interference with the engine or other necessary parts mounted centrally between the wheels, and without any crossing or overlapping links to interfere with each other.

The above and other objects of the invention will be apparent as the description proceeds.

According to the invention the steering linkage consists of two tie rods each having one end ball jointed to the steering arms of the wheels on opposite sides of the vehicle and their other ends connected together by a ball joint; the pitman arm of the steering gear box mounted towards one side of the vehicle frame, is ball jointed directly to the tie rod at that side of the vehicle, at a point intermediate of its ends.

Figure 1:
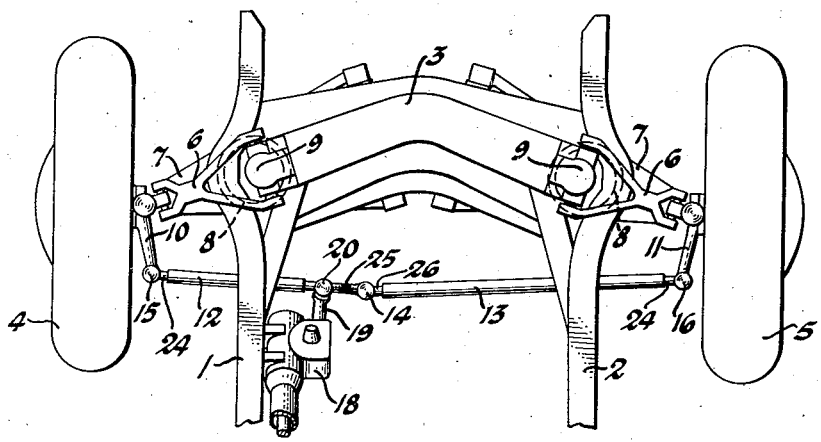
Fig. 1 is a plan view of the front end of a motor vehicle chassis having a steering linkage according to the invention.
Figure 2:
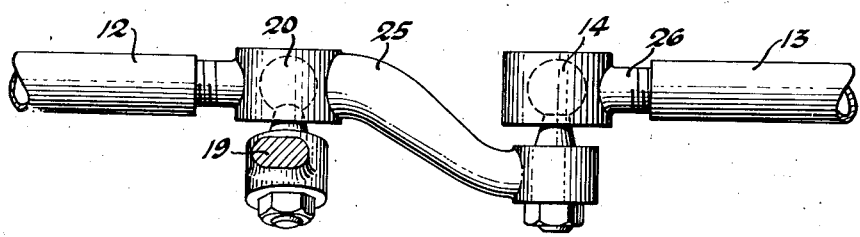
Fig. 2 is an enlarged elevational view of a part of Fig. 1.

The frame side members 1 and 2 are connected by a cross member 3 at the front end of the vehicle. A well known type of independent suspension supports the frame on the dirigible road wheels 4 and 5. It consists, for each wheel, of short upper and longer lower arms 6 and 7 respectively, pivotally connected to the vehicle frame and to the wheel knuckle support, for pivotal swinging movement in a substantially vertical transverse plane, with suitable means such as the coil spring 8 resiliently resisting such movement upward relatively to the frame.

The upper arms 6—V-shaped in plan—have their spaced apart limbs keyed or otherwise suitably fixed to the actuating spindles of shock absorbers 9 rigidly mounted on the cross member 3.

The pivot axes of the arms 6 and 7 for each wheel are, as shown, forwardly divergent away from the normally vertical longitudinal midplane of the vehicle.

A rearwardly projecting steering arm 10 is associated with the spindle for the wheel 4 and a similar steering arm 11 is associated with the spindle of the wheel 5.

The steering arms 10 and 11 are connected together by two tie rods 12 and 13, arranged end to end, with a ball joint 14 at their juncture, and with ball joint connections 15 and 16 to the steering arms.

The steering column assembly, including the gear box 18 mounted on the frame side member 1, is offset from the longitudinal center line of the vehicle, and actuates a pitman arm 19 which has a ball joint connection 20 with the tie rod 12, at a point intermediate of its ends.

Figure 3:
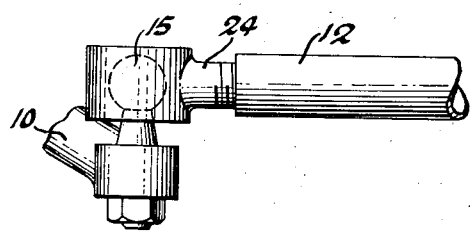
Fig. 3 is an enlarged elevational view of another part of Fig. 1.

As shown most clearly in Fig. 3, the steering arms 10 and 11 carry the ball portions of the ball joints 15 and 16, while the sockets therefor are formed at the ends of members such as 24 having stems screw threaded in those ends of the tubular tie rods 12 and 13, which are connected to the steering arms. The opposite ends of the tie rods 12 and 13 are provided respectively, with a cranked extension 25 screw threaded in the end of the tie rod 12 and carrying the ball portion of the ball joint 14, and a socket therefor formed at the end of a member 26 having a stem screw threaded in the end of the tie rod 13.

At a point intermediate of the ends of the extension 25, and hence intermediate of the ball joints 15 and 14 of the tie rod 12, is a socket, for the ball portion of the ball joint 20 which is carried by the pitman arm 19.

Because the steering gear 18 with its pitman arm 19 is offset to one side of the longitudinal center line of the vehicle, a construction according to the invention has the advantage that the ball joints 20 and 14 may be similarly offset on the same side of the center line, to provide increased clearance for the engine or other necessary parts mounted centrally between the wheels 4 and 5, with a minimum total necessary length and weight of rods and links in the steering linkage. When this is done, one of the tie rods will have its ball joint connections to the steering arm of its wheel and the other tie rod, on opposite sides of the longitudinal center line of the vehicle and may be bent as may be desired to clear what would otherwise be obstructions on the center line of the vehicle.

It will be appreciated that the screw threaded members 24, and 25, 26, provide for any necessary adjustment of the length of the tie rods 12 and 13 and that by choosing in suitable combination, the disposition and the actual and relative lengths of the sections 12, 13 and 25 of the tie rods, the length and position of the steering arms 10 and 11 in relation to the shorter upper arms 6 and the longer lower arms 7, and the angle if any, at which the pivot axes of the arms 6 and 7 are set to the normally vertical longitudinal mid-plane of the vehicle a steering linkage can be obtained in which the upward and downward deflections of the wheels relatively to the frame cause but little or no movement of the wheels about their steering axes (i. e. their king pin axis or its equivalent); or expressed otherwise the steering will be substantially unaffected by upward and downward deflections of the wheels relatively to the frame.

The tie rod 12 will turn about the center 20 and will have an effective length equal to the radius of the arc described by the point 15 of the steering arm 10 as the wheel 4 is deflected upwardly and downwardly relatively to the frame; while the tie rod 13 is obviously longer than the tie rod 12, its effective length as compared with the tie rod 12 is reduced to the extent that the center 14, about which it turns with upward and downward deflections of the wheels, itself moves in an arc of a circle about the center 20, thereby compensating for the actual difference in length of the tie rods 12 and 13 and making them of the same effective length.

The pivot axis of the arms 6 and 7 for each wheel need not be divergent away from the normally vertically longitudinal mid-plane of the vehicle as shown, but may be parallel thereto. The greater the separation between the virtual axes about which the balls 15 and 16 swing, the more advantageous a construction according to the present invention will be.

I claim:

1. Steering linkage for a pair of dirigible road wheels on opposite sides of a vehicle frame, including two tie rods pivotally connected to each other and to the wheels on opposite sides of the vehicle, and a steering gear box on the frame, having a pitman arm pivotally connected to one of the tie rods at a point intermediate of its pivotal connections to one of the wheels and to the other tie rod.

2. The combination according to claim 1, in which the steering gear box including its pitman arm, is offset on one side of the normally vertical longitudinal mid-plane of the vehicle, said pitman arm being connected to the tie rod of the wheel on that side of the vehicle.

3. The combination according to claim 1 in which that tie rod to which the pitman arm is pivotally connected is shorter than the other tie rod.

4. The combination according to claim 1, in which the tie rod to which the pitman arm is connected includes a part having an adjustable connection with the remainder of the said tie rod, the pitman arm and the other tie rod both being pivotally connected to the said part.

HENRY O. FUCHS.